(12) United States Patent
Wang et al.

(10) Patent No.: US 11,910,348 B2
(45) Date of Patent: Feb. 20, 2024

(54) REGISTER METHOD IN CELL AND TERMINAL DEVICE

(71) Applicant: Huawei Technologies Co., Ltd., Shenzhen (CN)

(72) Inventors: Ding Wang, Xi'an (CN); Xiaoyan Duan, Shenzhen (CN); Liwei Cui, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 17/423,306

(22) PCT Filed: Jan. 16, 2019

(86) PCT No.: PCT/CN2019/071906
§ 371 (c)(1),
(2) Date: Jul. 15, 2021

(87) PCT Pub. No.: WO2020/147030
PCT Pub. Date: Jul. 23, 2020

(65) Prior Publication Data
US 2022/0086790 A1 Mar. 17, 2022

(51) Int. Cl.
*H04W 60/04* (2009.01)
*H04W 60/06* (2009.01)
(Continued)

(52) U.S. Cl.
CPC ........... *H04W 60/04* (2013.01); *H04W 48/18* (2013.01); *H04W 60/06* (2013.01); *H04W 84/042* (2013.01)

(58) Field of Classification Search
CPC ..... H04W 60/04; H04W 48/18; H04W 60/06; H04W 84/042; H04W 76/30; H04W 8/14; H04W 36/30
See application file for complete search history.

(56) References Cited

U.S. PATENT DOCUMENTS 10,524,166 B2 * 12/2019 Youn .................... H04W 36/14
10,687,300 B2 * 6/2020 Youn .................... H04W 68/005
(Continued)

FOREIGN PATENT DOCUMENTS

CN 108702723 A 10/2018
CN 108924884 A 11/2018
(Continued)

OTHER PUBLICATIONS

C1-121268, Huawei, et al., "Regain normal services for limited UE," 3GPP TSG-CT WG1 Meeting #77, Taipei, Taiwan, Apr. 16-20, 2012, 3 pages.
(Continued)

*Primary Examiner* — Ahmed Elallam
(74) *Attorney, Agent, or Firm* — Conley Rose, P.C.

(57) ABSTRACT

A registration method applied in a terminal device includes sending a first request, where the first request is used to request to register in a first cell, receiving a first message, where the first message is used to indicate that the terminal device is successfully registered in the first cell, when the first message does not carry a first network slice identifier and the terminal device cannot establish a protocol data unit (PDU) session on a first network slice corresponding to the first network slice identifier, sending a second request, where the second request is used to request to register in a second cell, receiving a second message, where the second message carries a second network slice identifier, and establishing the PDU session on a second network slice corresponding to the second network slice identifier.

20 Claims, 9 Drawing Sheets

(51) Int. Cl.
*H04W 48/18* (2009.01)
*H04W 36/30* (2009.01)
*H04W 84/04* (2009.01)

(56) References Cited

U.S. PATENT DOCUMENTS

| | | | |
|---|---|---|---|
| 10,791,508 B2 * | 9/2020 | Park | H04W 48/18 |
| 11,096,097 B2 * | 8/2021 | Jin | H04W 36/0058 |
| 11,140,621 B2 * | 10/2021 | Velev | H04W 48/18 |
| 11,388,661 B2 * | 7/2022 | Ramle | H04L 41/0897 |
| 11,539,699 B2 * | 12/2022 | Kunz | H04W 12/35 |
| 11,589,270 B2 * | 2/2023 | Jing | H04W 36/0066 |
| 2013/0143548 A1 | 6/2013 | Rayavarapu et al. | |
| 2018/0376384 A1 | 12/2018 | Youn et al. | |
| 2018/0376445 A1 | 12/2018 | Yoon et al. | |
| 2019/0014515 A1 | 1/2019 | Zee et al. | |
| 2019/0357129 A1 | 11/2019 | Park et al. | |
| 2020/0037214 A1 | 1/2020 | Jin et al. | |
| 2020/0120548 A1 | 4/2020 | Jin et al. | |
| 2020/0145878 A1 | 5/2020 | Jin et al. | |
| 2020/0374947 A1 | 11/2020 | Jin et al. | |
| 2021/0250854 A1 * | 8/2021 | Olvera-Hernandez | H04W 48/16 |
| 2021/0360569 A1 * | 11/2021 | Park | H04W 28/0289 |
| 2022/0248185 A1 * | 8/2022 | Talebi Fard | H04W 8/186 |

FOREIGN PATENT DOCUMENTS

| | | |
|---|---|---|
| CN | 109151871 A | 1/2019 |
| CN | 109151940 A | 1/2019 |
| CN | 109155949 A | 1/2019 |
| IN | 108811020 A | 11/2018 |
| WO | 2018093168 A1 | 5/2018 |
| WO | 2018145727 A1 | 8/2018 |

OTHER PUBLICATIONS

C1-180460, Huawei, et al., "LADN information update and session release," 3GPP TSG-CT WG1 Meeting #108, Gothenburg (Sweden), Jan. 22-26, 2018, 7 pages.

S2-1812403, Motorola Mobility, et al., "KI#3: Update to Solution 3.3 on (re-)authentication after failure/revocation," SA WG2 Meeting #129bis, Oct. 25-30, 2018, West Palm Beach, Florida, 4 pages.

"3rd Generation Partnership Project; Technical Specification Group Core Network and Terminals; Non-Access-Stratum (NAS) protocol for 5G System (5GS); Stage 3 (Release 15)," 3GPP TS 24.501 V15.2.1, Jan. 2019, 455 pages.

"3rd Generation Partnership Project; Technical Specification Group Core Network and Terminals; Non-Access-Stratum (NAS) protocol for 5G System (5GS); Stage 3 (Release 15)," 3GPP TS 24.501 V15.1.0, Sep. 2018, 398 pages.

Huawei, et al., "Network slicing support for roaming—MM aspects," 3GPP TSG-CT WG1 Meeting #108, C1-180304, Gothenburg (Sweden), Jan. 22-26, 2018, 10 pages.

Huawei, "Network slicing support for roaming—MM aspects, " 3GPP TSG-CT WG1 Meeting #108, C1-180719, Gothenburg (Sweden), Jan. 22-26, 2018, 9 pages.

Vivo, "SMF initiated SM congestion control," 3GPP TSG-CT WG1 Meeting #109, C1-181067, Montreal (Canada), Feb. 26-Mar. 2, 2018, 13 pages.

ZTE, "Idle mode behaviour for NW slice," 3GPP TSG-RAN WG2 Meeting #99, R2-1708109, Berlin, Germany, Aug. 21-25, 2017, 4 pages.

* cited by examiner

REGISTER METHOD IN CELL AND TERMINAL DEVICE

CROSS-REFERENCE TO RELATED APPLICATIONS

This is a National Stage of International Patent Application No. PCT/CN2019/071906 filed on Jan. 16, 2019, which is hereby incorporated by reference in its entirety.

TECHNICAL FIELD

This application relates to the field of communications technologies, and in particular, to a register method in a cell and a terminal device.

BACKGROUND

With continuous emergence of various communications services, requirements of different communications services on network performance are significantly different. A concept of network slice (network slice, NS) is introduced into a 5th-generation (the 5th-generation, 5G) system, to cope with a difference between the requirements of the different communications services on the network performance. To be specific, resource and function division is performed on a 5G network, to form different network slices to satisfy the different requirements, so that network operation investment costs can be reduced, and network operation modes can be enriched.

Currently, when a terminal device is to be registered with a 5G network in a cell, the terminal device sends a registration request to a network side. The request may carry requested network slice selection assistance information (network slice selection assistance information, NSSAI). After accepting the registration request, the network side returns a registration accept message to the terminal device, where the registration accept message may be used to notify the terminal device of registration-related information of a network slice. However, when the cell in which the terminal device is currently successfully registered is unavailable, the terminal device, though successfully registered in the cell, cannot normally perform a subsequent step such as PDU session establishment.

SUMMARY

This application provides a registration method in a cell and a terminal device, to resolve a problem that a terminal cannot normally perform a subsequent step when a cell in which the terminal is currently successfully registered is unavailable.

To achieve the foregoing objective, the following technical solutions are used in the embodiments of this application.

According to a first aspect, a registration method in a cell is provided. The method includes: A terminal device receives a first message, where the first message is used to indicate that the terminal device is successfully registered in a first cell; and when the first message does not carry a first network slice identifier, or when the first message carries a first network slice identifier and the terminal device cannot establish a PDU session on a first network slice corresponding to the first network slice identifier, the terminal device sends a second request, where the second request is used to request to register in a second cell, and the second cell is different from the first cell. In the foregoing technical solution, when the first message does not carry the first network slice identifier, or when the first message carries the first network slice identifier and the terminal device cannot establish the PDU session on the first network slice corresponding to the first network slice identifier, that is, when the first cell is unavailable, the terminal device initiates a registration procedure in the second cell, to resolve a problem that the terminal cannot normally perform a subsequent step when the first cell is unavailable.

In a possible implementation of the first aspect, after the terminal device sends the second request, the method further includes: The terminal device receives a second message, where the second message carries a second network slice identifier. In the foregoing possible implementation, the terminal device can be successfully registered in the second cell.

In a possible implementation of the first aspect, the method further includes: The terminal device establishes the PDU session on a second network slice corresponding to the second network slice identifier. In the foregoing possible implementation, the terminal can establish the PDU session on the second network slice corresponding to the second network slice identifier, to further provide a service for a user.

In a possible implementation of the first aspect, before the terminal device sends the second request, the method further includes: selecting the second cell from a first tracking area, where the first tracking area is a tracking area including the first cell. Optionally, the terminal device marks the first cell as a barred cell. In the foregoing possible implementation, a simple and effective manner of selecting the second cell is provided, and the terminal device does not need to perform location updating. In addition, a probability of selecting an available cell by the terminal device can be improved by marking the first cell as a barred cell.

In a possible implementation of the first aspect, before the terminal device sends the second request, the method further includes: selecting the second cell from a second tracking area, where the second tracking area is different from a first tracking area including the first cell. Optionally, the terminal device marks the first tracking area as a forbidden tracking area. In the foregoing possible implementation, a simple and effective manner of selecting the second cell is provided. In addition, a probability of selecting an available cell by the terminal device can be improved by marking the first tracking area as a forbidden tracking area.

In a possible implementation of the first aspect, before the terminal device sends the second request, the method further includes: selecting the second cell from a second registration area, where the second registration area is different from a first registration area including the first cell. Optionally, the terminal device marks the first registration area as a forbidden registration area. In the foregoing possible implementation, a simple and effective manner of selecting the second cell is provided. In addition, a probability of selecting an available cell by the terminal device can be improved by marking the first registration area as a forbidden registration area.

In a possible implementation of the first aspect, before the terminal device sends the second request, the method further includes: selecting the second cell from a second public land mobile network PLMN, where the second PLMN is different from a first PLMN including the first cell. Optionally, the terminal device marks the first PLMN as a forbidden PLMN. In the foregoing possible implementation, a simple and effective manner of selecting the second cell is provided. In addition, a probability of selecting an available cell by the terminal device can be improved by marking the first PLMN as a forbidden PLMN.

In a possible implementation of the first aspect, before the terminal device receives the second message sent by the first cell, the method further includes: The terminal device sends a first request to the first cell, where the first request is used to request to register in the first cell.

In a possible implementation of the first aspect, before the terminal device sends the second request, the method further includes: deregistering in the first cell. For example, the terminal device may locally perform a deregistration operation, or the terminal device initiates a deregistration procedure to the first cell. In the foregoing possible implementation, the terminal device can be prevented from simultaneously registering in a plurality of cells, and storage space of the terminal device or a network side device can be saved.

In a possible implementation of the first aspect, a registration type corresponding to the first message is non-emergency registration, and the first message does not carry allowed network slice selection assistance information NSSAI, or a length of NSSAI content of allowed NSSAI carried in the first message is 0. In the foregoing possible implementation, a manner of determining that the first cell is unavailable is provided, so that when determining that the first cell is unavailable, the terminal device selects an appropriate network slice through re-registration in the second cell, and then provides a service for a user by using the network slice.

In a possible implementation of the first aspect, a registration type corresponding to the first message is non-emergency registration, the first message does not carry configured NSSAI, a service type of allowed NSSAI that is carried is different from a target service type, and the first network slice identifier is included in the allowed NSSAI. In the foregoing possible implementation, a manner of determining that the first cell is unavailable is provided, so that when determining that the first cell is unavailable, the terminal device selects an appropriate network slice through re-registration in the second cell, and then provides a service for a user by using the network slice.

In a possible implementation of the first aspect, a registration type corresponding to the first message is non-emergency registration, a service type of allowed NSSAI carried in the first message is different from a target service type, a service type of configured NSSAI carried in the first message is also different from the target service type, and the first network slice identifier is included in the allowed NSSAI and/or the configured NSSAI. In the foregoing possible implementation, a manner of determining that the first cell is unavailable is provided, so that when determining that the first cell is unavailable, the terminal device selects an appropriate network slice through re-registration in the second cell, and then provides a service for a user by using the network slice.

According to a second aspect, a terminal device is provided. The terminal device includes: a receiving unit, configured to receive a first message, where the first message is used to indicate that the terminal device is successfully registered in a first cell; and a sending unit, configured to: when the first message does not carry a first network slice identifier, or when the first message carries a first network slice identifier and the terminal device cannot establish a PDU session on a first network slice corresponding to the first network slice identifier, send a second request, where the second request is used to request to register in a second cell, and the second cell is different from the first cell.

In a possible implementation of the second aspect, the receiving unit is further configured to receive a second message, where the second message carries a second network slice identifier.

In a possible implementation of the second aspect, the terminal device further includes: a processing unit, configured to establish the PDU session on a second network slice corresponding to the second network slice identifier.

In a possible implementation of the second aspect, the processing unit is further configured to select the second cell from a first tracking area, where the first tracking area is a tracking area including the first cell. Optionally, the processing unit is further configured to mark the first cell as a barred cell.

In a possible implementation of the second aspect, the processing unit is further configured to select the second cell from a second tracking area, where the second tracking area is different from a first tracking area including the first cell. Optionally, the processing unit is further configured to mark the first tracking area as a forbidden tracking area.

In a possible implementation of the second aspect, the processing unit is further configured to select the second cell from a second registration area, where the second registration area is different from a first registration area including the first cell. Optionally, the processing unit is further configured to mark the first registration area as a forbidden registration area.

In a possible implementation of the second aspect, the processing unit is further configured to select the second cell from a second public land mobile network PLMN, where the second PLMN is different from a first PLMN including the first cell. Optionally, the processing unit is further configured to mark the first PLMN as a forbidden PLMN.

In a possible implementation of the second aspect, the processing unit is further configured to deregister in the first cell.

In a possible implementation of the second aspect, a registration type corresponding to the first message is non-emergency registration, and the first message does not carry allowed network slice selection assistance information NSSAI, or a length of NSSAI content of allowed NSSAI carried in the first message is 0.

In a possible implementation of the second aspect, a registration type corresponding to the first message is non-emergency registration, the first message does not carry configured NSSAI, a service type of allowed NSSAI that is carried is different from a target service type, and the first network slice identifier is included in the allowed NSSAI.

In a possible implementation of the second aspect, a registration type corresponding to the first message is non-emergency registration, a service type of allowed NSSAI carried in the first message is different from a target service type, a service type of configured NSSAI carried in the first message is also different from the target service type, and the first network slice identifier is included in the allowed NSSAI and/or the configured NSSAI.

According to a third aspect, a terminal device is provided. The terminal device includes a memory and a processor coupled to the memory, the memory stores instructions and data, and the processor runs the instructions to enable the terminal device to perform the following steps: receiving a first message, where the first message is used to indicate that the terminal device is successfully registered in a first cell; and when the first message does not carry a first network slice identifier, or when the first message carries a first network slice identifier and the terminal device cannot establish a PDU session on a first network slice corresponding to the first network slice identifier, sending a second request, where the second request is used to request to register in a second cell, and the second cell is different from the first cell.

In a possible implementation of the third aspect, the terminal device further performs the following step: receiving a second message, where the second message carries a second network slice identifier.

In a possible implementation of the third aspect, the terminal device further performs the following step: establishing the PDU session on a second network slice corresponding to the second network slice identifier.

In a possible implementation of the third aspect, before the terminal device sends the second request, the terminal device further performs the following step: selecting the second cell from a first tracking area, where the first tracking area is a tracking area including the first cell.

In a possible implementation of the third aspect, the terminal device further performs the following step: marking the first cell as a barred cell.

In a possible implementation of the third aspect, before the terminal device sends the second request, the terminal device further performs the following step: selecting the second cell from a second tracking area, where the second tracking area is different from a first tracking area including the first cell.

In a possible implementation of the third aspect, the terminal device further performs the following step: marking the first tracking area as a forbidden tracking area.

In a possible implementation of the third aspect, before the terminal device sends the second request, the terminal device further performs the following step: selecting the second cell from a second registration area, where the second registration area is different from a first registration area including the first cell.

In a possible implementation of the third aspect, the terminal device further performs the following step: marking the first registration area as a forbidden registration area.

In a possible implementation of the third aspect, before the terminal device sends the second request, the terminal device further performs the following step: selecting the second cell from a second public land mobile network PLMN, where the second PLMN is different from a first PLMN including the first cell.

In a possible implementation of the third aspect, the terminal device further performs the following step: marking the first PLMN as a forbidden PLMN.

In a possible implementation of the third aspect, before the terminal device receives the first message sent by the first cell, the terminal device further performs the following step: sending a first request to the first cell, where the first request is used to request to register in the first cell.

In a possible implementation of the third aspect, the terminal device further performs the following step: deregistering in the first cell.

In a possible implementation of the third aspect, a registration type corresponding to the first message is non-emergency registration, and the first message does not carry allowed network slice selection assistance information NSSAI, or a length of NSSAI content of allowed NSSAI carried in the first message is 0.

In a possible implementation of the third aspect, a registration type corresponding to the first message is non-emergency registration, the first message does not carry configured NSSAI, a service type of allowed NSSAI that is carried is different from a target service type, and the first network slice identifier is included in the allowed NSSAI.

In a possible implementation of the third aspect, a registration type corresponding to the first message is non-emergency registration, a service type of allowed NSSAI carried in the first message is different from a target service type, a service type of configured NSSAI carried in the first message is also different from the target service type, and the first network slice identifier is included in the allowed NSSAI and/or the configured NSSAI.

According to a fourth aspect, a chip is provided. The chip is a chip built in a terminal device. The chip includes a memory and a processor coupled to the memory, the memory stores instructions and data, and the processor runs the instructions to enable the chip to perform the following steps: receiving a first message, where the first message is used to indicate that the terminal device is successfully registered in a first cell; and when the first message does not carry a first network slice identifier, or when the first message carries a first network slice identifier and the chip cannot establish a PDU session on a first network slice corresponding to the first network slice identifier, sending a second request, where the second request is used to request to register in a second cell, and the second cell is different from the first cell.

In a possible implementation of the fourth aspect, the chip further performs the following step: receiving a second message, where the second message carries a second network slice identifier.

In a possible implementation of the fourth aspect, the chip further performs the following step: establishing the PDU session on a second network slice corresponding to the second network slice identifier.

In a possible implementation of the fourth aspect, before the chip sends the second request, the chip further performs the following step: selecting the second cell from a first tracking area, where the first tracking area is a tracking area including the first cell.

In a possible implementation of the fourth aspect, the chip further performs the following step: marking the first cell as a barred cell.

In a possible implementation of the fourth aspect, before the chip sends the second request, the chip further performs the following step: selecting the second cell from a second tracking area, where the second tracking area is different from a first tracking area including the first cell.

In a possible implementation of the fourth aspect, the chip further performs the following step: marking the first tracking area as a forbidden tracking area.

In a possible implementation of the fourth aspect, before the chip sends the second request, the chip further performs the following step: selecting the second cell from a second registration area, where the second registration area is different from a first registration area including the first cell.

In a possible implementation of the fourth aspect, the chip further performs the following step: marking the first registration area as a forbidden registration area.

In a possible implementation of the fourth aspect, before the chip sends the second request, the chip further performs the following step: selecting the second cell from a second public land mobile network PLMN, where the second PLMN is different from a first PLMN including the first cell.

In a possible implementation of the fourth aspect, the chip further performs the following step: marking the first PLMN as a forbidden PLMN.

In a possible implementation of the fourth aspect, before the chip receives the first message sent by the first cell, the chip further performs the following step: sending a first request to the first cell, where the first request is used to request to register in the first cell.

In a possible implementation of the fourth aspect, the chip further performs the following step: deregistering in the first cell.

In a possible implementation of the fourth aspect, a registration type corresponding to the first message is non-emergency registration, and the first message does not carry allowed network slice selection assistance information NSSAI, or a length of NSSAI content of allowed NSSAI carried in the first message is 0.

In a possible implementation of the fourth aspect, a registration type corresponding to the first message is non-emergency registration, the first message does not carry configured NSSAI, a service type of allowed NSSAI that is carried is different from a target service type, and the first network slice identifier is included in the allowed NSSAI.

In a possible implementation of the fourth aspect, a registration type corresponding to the first message is non-emergency registration, a service type of allowed NSSAI carried in the first message is different from a target service type, a service type of configured NSSAI carried in the first message is also different from the target service type, and the first network slice identifier is included in the allowed NSSAI and/or the configured NSSAI.

According to another aspect of this application, a computer-readable storage medium is provided. The computer-readable storage medium stores instructions. When the instructions are run on a computer, the computer is enabled to perform the registration method in a cell according to any one of the first aspect or the possible implementations of the first aspect.

According to another aspect of this application, a computer program product including instructions is provided. When the computer program product is run on a computer, the computer is enabled to perform the registration method in a cell according to any one of the first aspect or the possible implementations of the first aspect.

It may be understood that any terminal device, chip, computer storage medium, or computer program product in the registration method in a cell provided above are all configured to perform the corresponding method provided above. Therefore, for beneficial effects that can be achieved, refer to beneficial effects in the corresponding method provided above. Details are not described herein again.

DESCRIPTION OF EMBODIMENTS

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof means any combination of these items, including a single item (piece) or any combination of a plurality of items (pieces). For example, at least one of a, b, or c may indicate: a, b, c, a and b, a and c, b and c, or a, b, and c, where a, b, and c may be in a singular or plural form. In addition, in the embodiments of this application, terms such as "first" and "second" do not limit a quantity or an execution sequence.

It should be noted that in this application, the term such as "example" or "for example" is used to represent giving an example, an illustration, or a description. Any embodiment or design scheme described as "an example" or "for example" in this application should not be explained as being more preferred or having more advantages than another embodiment or design scheme. Exactly, use of the word "example", "for example", or the like is intended to present a related concept in a specific manner.

First, to facilitate understanding of the embodiments of this application, some technical terms in the embodiments of this application are described.

A network slice (network slice, NS) may also be referred to as a slice network, may also be referred to as a slice for short, and is a logical network customized based on service requirements of services of different tenants (tenant) on a physical or virtual network infrastructure. The network slice may be a complete end-to-end network that includes a terminal device, an access network, a transport network, a core network, and a service server, or may be a complete end-to-end network that includes only a core network but is assisted by a terminal device, an access network, a transport network, and a service server, can provide a complete communications service, and has a network capability. The network slice may be a communications resource that ensures that a bearer service or a service can satisfy a service level agreement requirement, or may be considered as a combination of a network function and a communications resource that are required to complete a communications service or some communications services.

Figure 1:
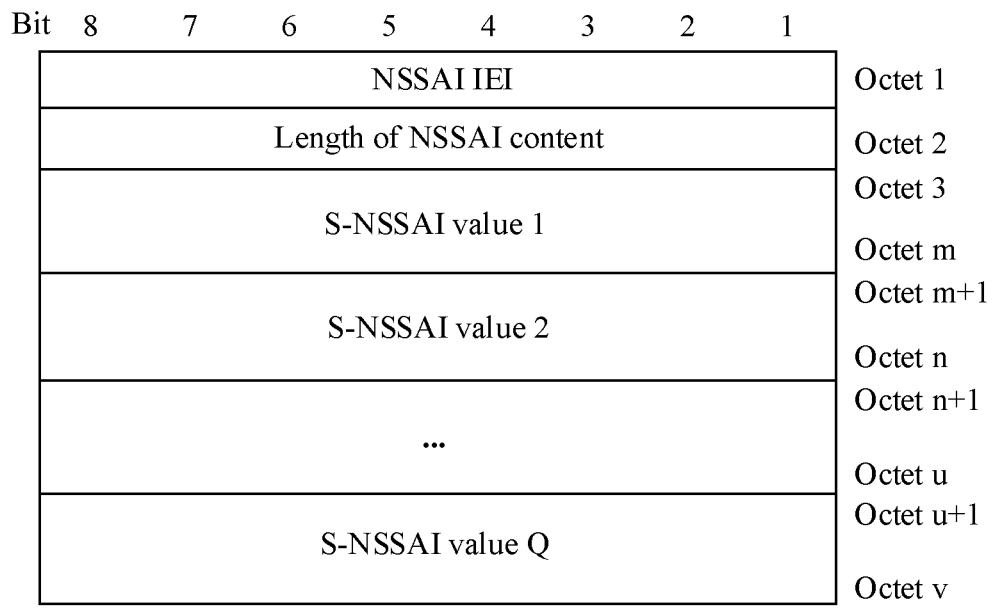
FIG. 1 is a schematic structural diagram of NSSAI according to an embodiment of this application.

As shown in FIG. 1, network slice selection assistance information (network slice selection assistance information, NSSAI) may include an NSSAI information element identity (information element identity, IEI), a length of NS SAI content, and one or more single network slice selection assistance information (single network slice selection assistance information, S-NSSAI) values (value). In FIG. 1, Q S-NSSAI values are used as an example for description. The NSSAI IEI and the length of NSSAI content each occupy 1 octet (namely, 8 bits), and each S-NS SAI value may occupy a plurality of octets. Details are shown in FIG. 1. In FIG. 1, m, n, u, and v are all positive integers. The S-NSSAI value may be used to identify a specific network slice. The S-NSSAI value may include a slice/service type (slice/service type, SST) and a slice differentiator (slice differentiator, SD). The SST and the SD may be defined in a standard or defined by an operator. The SD is optional information supplementary to the SST, to distinguish between a plurality of network slices of a same SST.

Figure 1A:
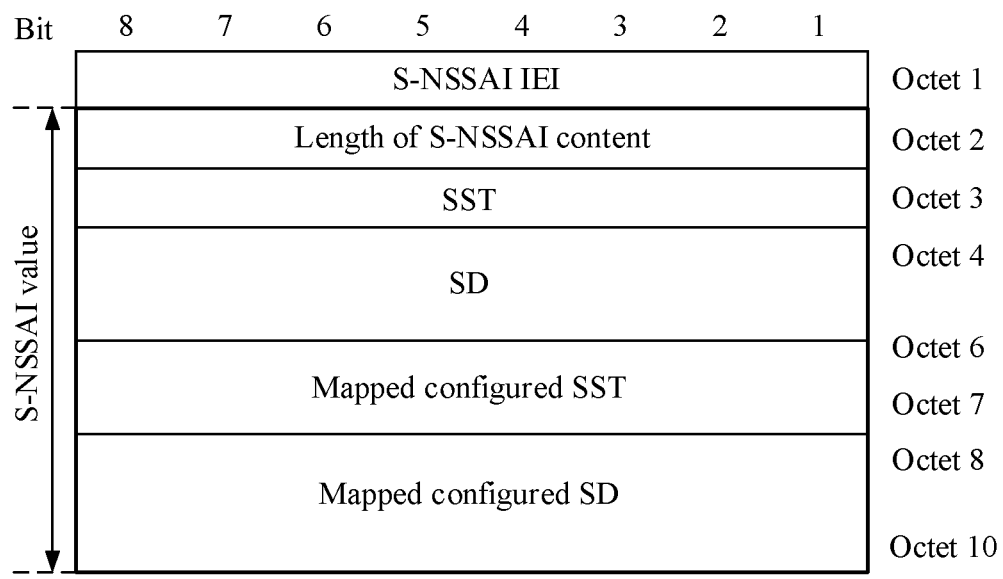
FIG. 1A is a schematic structural diagram of S-NSSAI according to an embodiment of this application.

As shown in FIG. 1A, one piece of S-NSSAI may include two parts: an S-NSSAI IEI and an S-NSSAI value. A length of the S-NSSAI IEI is 1 octet (namely, 8 bits). The S-NSSAI value may include a length of S-NSSAI content (length of S-NSSAI content), an SST, an SD, a mapped configured SST (mapped configured SST), and a mapped configured SD (mapped configured SD). Herein, the mapped configuration SST and the mapped configuration SD are an SST and an SD of a slice to which the slice maps on a home network.

The SD, the mapped configuration SST, and the mapped configuration SD in FIG. 1A are optional fields in the S-NS SAL The SST is a mandatory field and is used to indicate a service type provided by the slice. Current protocols define three SST values. Specifically, as shown in Table 1, when an SST value is 1, it indicates that the service type of the slice is enhanced mobile broadband (enhanced Mobile Broadband, eMBB), and the slice is suitable for handling of 5G enhanced mobile broadband. When an SST value is 2, it indicates that the service type of the slice is ultra-reliable low latency communications (ultra-reliable low latency communications, uRLLC), and the slice is suitable for handling of ultra-reliable low latency communications. When an SST value is 3, it indicates that the service type of the slice is massive internet of things (massive IoT, MIoT), and the slice is suitable for handling of massive IoT. The IoT is short for internet of things (internet of things).

TABLE 1

| Slice/Service type | SST value | Characteristics |
|---|---|---|
| eMBB | 1 | Slice suitable for handling of 5G enhanced mobile broadband (Slice suitable for handling of 5G enhanced Mobile Broadband) |
| uRLLC | 2 | Slice suitable for handling of ultra-reliable low latency communications (Slice suitable for handling of ultra-reliable low latency communications) |
| MIoT | 3 | Slice suitable for handling of massive IoT (Slice suitable for handling of massive IoT) |

Figure 2:
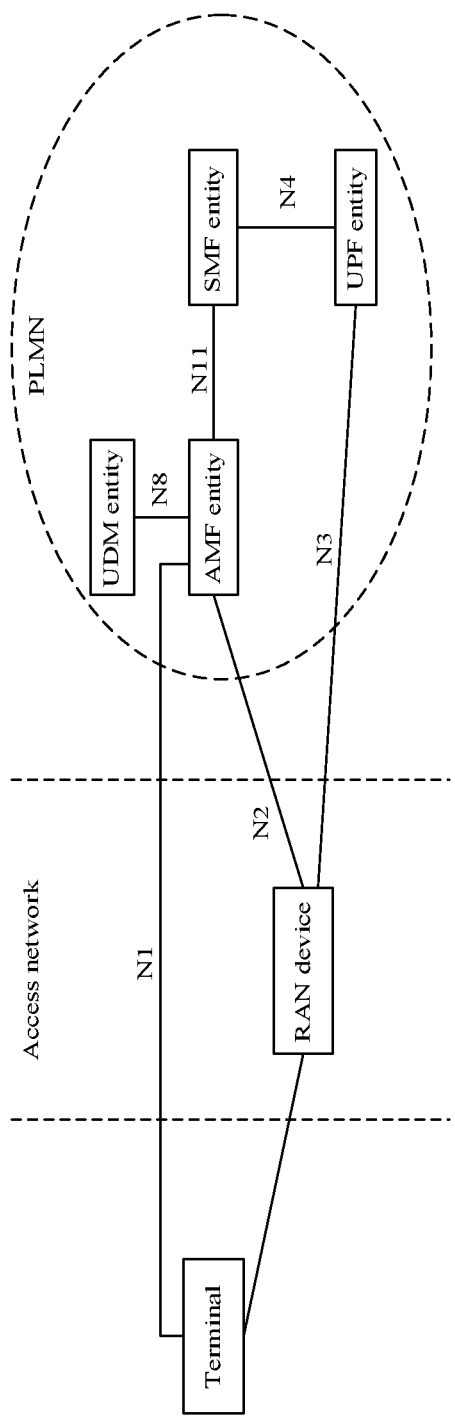
FIG. 2 is a schematic structural diagram of a 5G network according to an embodiment of this application.

FIG. 2 is a schematic structural diagram of a 5G network according to an embodiment of this application. Referring to FIG. 2, a terminal device may access a public land mobile network (public land mobile network, PLMN) by using an access network. For example, the terminal device accesses the PLMN by using a radio access network (radio access network, RAN) device. The PLMN may include an access and mobility management function (access and mobility management function, AMF) entity, a user plane function (user plane function, UPF) entity, a session management function (session management function, SMF) entity, and a unified data management (unified data management, UDM) entity.

In the 5G network, the AMF entity may be used to authenticate and authorize a user and manage mobility of the user. The SMF entity is a control plane device, and may be used to provide a control plane service for a PDU (Protocol Data Unit, PDU) session of the terminal device and manage a 5G PDU session and 5G quality of service (Quality of Service, QoS), and is responsible for assigning an IP address for the terminal device and selecting a UPF for the terminal device and the like. The UPF entity is a user plane device, may be used to provide a user plane service for a PDU session of the terminal device, and is an interface gateway between a carrier network and an external network. The UDM entity may be used to store subscription data of a user and the like.

The terminal device communicates with the AMF entity through a next generation (Next generation, N) network interface 1 (N1 for short). The RAN device communicates with the AMF entity through an N2 interface (N2 for short). The RAN device communicates with the UPF entity through an N3 interface (N3 for short). The AMF entity communicates with the UDM entity through an N8 interface (N8 for short). The AMF entity communicates with the SMF entity through an N11 interface (N11 for short). The SMF entity communicates with the UPF entity through an N4 interface (N4 for short). It should be noted that, names of the interfaces between the network elements in FIG. 2 are merely examples, and the interfaces may have other names during specific implementation. This is not specifically limited in the embodiments of this application.

Optionally, the RAN device in the embodiments of this application may be a device accessing the PLMN by using the 3GPP access technology. For example, the RAN device may be a base station, a broadband network gateway (broadband network gateway, BNG), or an aggregation switch. This is not specifically limited in the embodiments of this application. The base station may include various types of base stations, such as a macro base station, a micro base station (also referred to as a small cell), a relay node, and an access point. This is not specifically limited in the embodiments of this application.

It should be noted that there may be one or more SMF entities, UPF entities, AMF entities, and UDM entities in the PLMN in FIG. 2. An example in which there is only one SMF entity, UPF entity, AMF entity, and UDM entity is used for description in FIG. 2. In addition, the RAN device, the SMF entity, the UPF entity, the AMF entity, the UDM entity, and the like in FIG. 2 are merely names, and the names constitute no limitation on devices. In the 5G network and another future network, network elements or entities corresponding to the RAN device, the SMF entity, the UPF entity, the AMF entity, and the UDM entity may alternatively have other names. This is not specifically limited in the embodiments of this application. For example, the UDM entity may be replaced with a home subscriber server (home subscriber server, HSS), a user subscription database (user subscription database, USD), or a database entity. This is not specifically limited in the embodiments of this application.

In addition, the PLMN may further include another network element such as an authentication server function (authentication server function, AUSF) entity or a policy control function (policy control function, PCF) entity. This is not specifically limited in the embodiments of this application.

It should be noted that a network to which the embodiments of this application are applied may be a 5G network, another network that may appear in the future, or the like. In the embodiments of this application, an architecture of the 5G network is merely used as an example for description, and this does not constitute a limitation on the embodiments of this application.

Figure 2A:
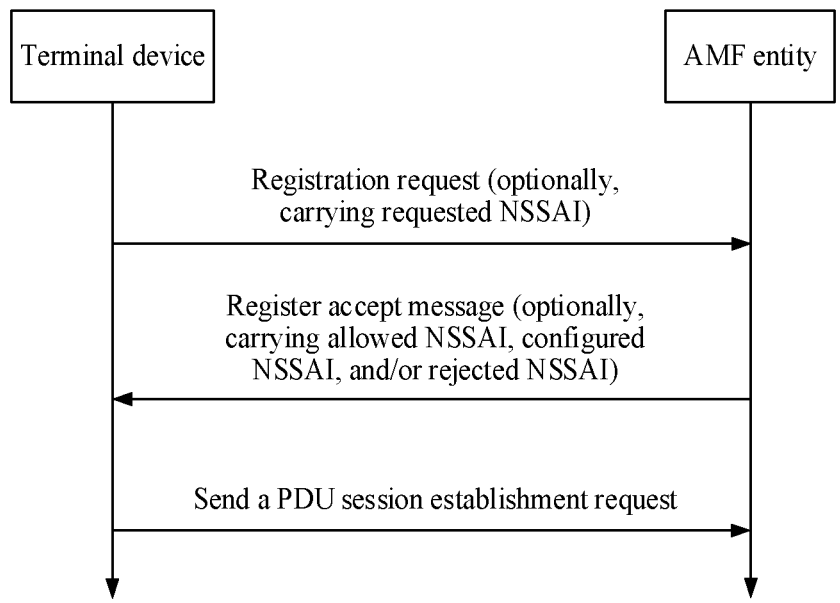
FIG. 2A is a schematic flowchart of registration in a cell according to an embodiment of this application.

In the embodiments of this application, when the terminal device is registered with the 5G network in a cell (for example, a cell A), the terminal device needs to be registered with one or more slices. Specifically, as shown in FIG. 2A, the terminal device may send a registration request (registration request) message to an AMF entity on a network side. The registration request is used to request to register in the cell A, and the registration request may carry requested NSSAI (requested NSSAI). The requested NSSAI is optional. When the AMF entity receives the registration request, the AMF entity may return a registration accept (registration accept) message to the terminal device. The registration accept message is used to indicate that the terminal device is successfully registered in the cell A. The registration accept message may carry allowed NSSAI (allowed NSSAI), configured NSSAI (configured NSSAI), and/or rejected NSSAI (rejected NSSAI). The allowed NSSAI, the configured NSSAI, and the rejected NSSAI are all optional. Further, the terminal device may select a network slice based on the allowed NSSAI, to send a PDU session establishment request to the AMF entity, so as to establish a PDU session.

Specific descriptions of the allowed NSSAI, the configured NSSAI, and the rejected NSSAI are shown in Table 2.

TABLE 2

| Allowed NSSAI | One or more slices with which the terminal device is successfully registered, where each slice is identified by an S-NSSAI value |
| Configured NSSAI | Slices configured by a network for a user, where each slice is identified by an S-NSSAI value |
| Rejected NSSAI | Including slices rejected by the network in the requested NSSAI, where each slice is identified by an S-NSSAI value |

Figure 2B:
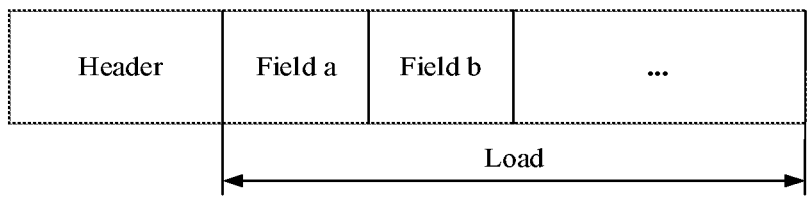
FIG. 2B is a schematic diagram of a packet corresponding to a registration request according to an embodiment of this application.
Figure 2C:
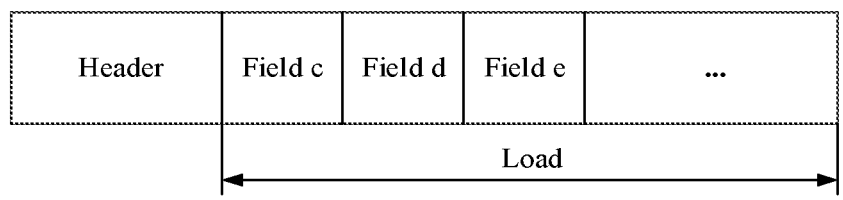
FIG. 2C is a schematic diagram of a packet corresponding to a registration accept message according to an embodiment of this application.

For example, FIG. 2B is a schematic structural diagram of a packet corresponding to a registration request. The packet includes a header (header) and a load (load), the header is used to indicate that information carried in the packet is a registration request, and the load is specific content of the registration request. The load may include a field a used to carry requested NSSAI (namely, requested NSSAI), a field b used to carry a registration type, one or more fields used to carry other information, and the like. FIG. 2C is a schematic structural diagram of a packet corresponding to a registration accept message. The packet also includes a header (header) and a load (load), the header is used to indicate that information carried in the packet is a registration accept message, and the load is specific content of the registration accept message. The load may include a field c used to carry allowed NSSAI (namely, allowed NSSAI), a field d used to carry configured NSSAI (namely, configured NSSAI), a field e used to carry rejected NSSAI (namely, rejected NSSAI), one or more fields used to carry other information, and the like.

It should be noted that registration in a cell means registration of the terminal device in an access network, and registration with a network slice means registration of the terminal device in a core network.

Further, after the terminal device is successfully registered in a current cell, the terminal device may select, based on the allowed NS SAI included in the registration accept message, a slice with which the terminal device is registered, to perform a subsequent operation, for example, establish a PDU session on the selected slice. However, because the allowed NSSAI and the configured NSSAI carried in the registration accept message are optional, when the network side does not use the registration accept message to carry the allowed NS SAI for some reasons, or when a length of NSSAI content of the allowed NSSAI is 0, the terminal device cannot normally select a slice (that is, the cell in which the terminal device is currently successfully registered is unavailable) or cannot predict behavior of the network side when establishing the PDU session. Therefore, the terminal device cannot perform the subsequent operation. Alternatively, when the registration accept message carries the allowed NSSAI and/or the configured NSSAI, and both a service type of the allowed NSSAI and a service type of the configured NSSAI are different from a service type required by the terminal device (that is, the cell in which the terminal device is currently successfully registered is unavailable), the terminal device cannot further obtain a required service.

Based on this, the embodiments of this application provide a registration method in a cell, to resolve a problem that a cell in which the terminal device is currently successfully registered is unavailable. A principle of this method is that when the terminal device determines that a cell in which the terminal device is currently successfully registered is unavailable, the terminal device reselects a cell, and initiates a registration procedure in the selected cell, to obtain a normal service.

The terminal device in this application may be a mobile phone, a tablet computer, an ultra-mobile personal computer (Ultra-mobile Personal Computer, UMPC), a netbook, a wearable device (for example, a smart band or a smart watch), a vehicle-mounted device, or the like. For ease of description, these devices are collectively referred to as a terminal device herein.

Figure 3:
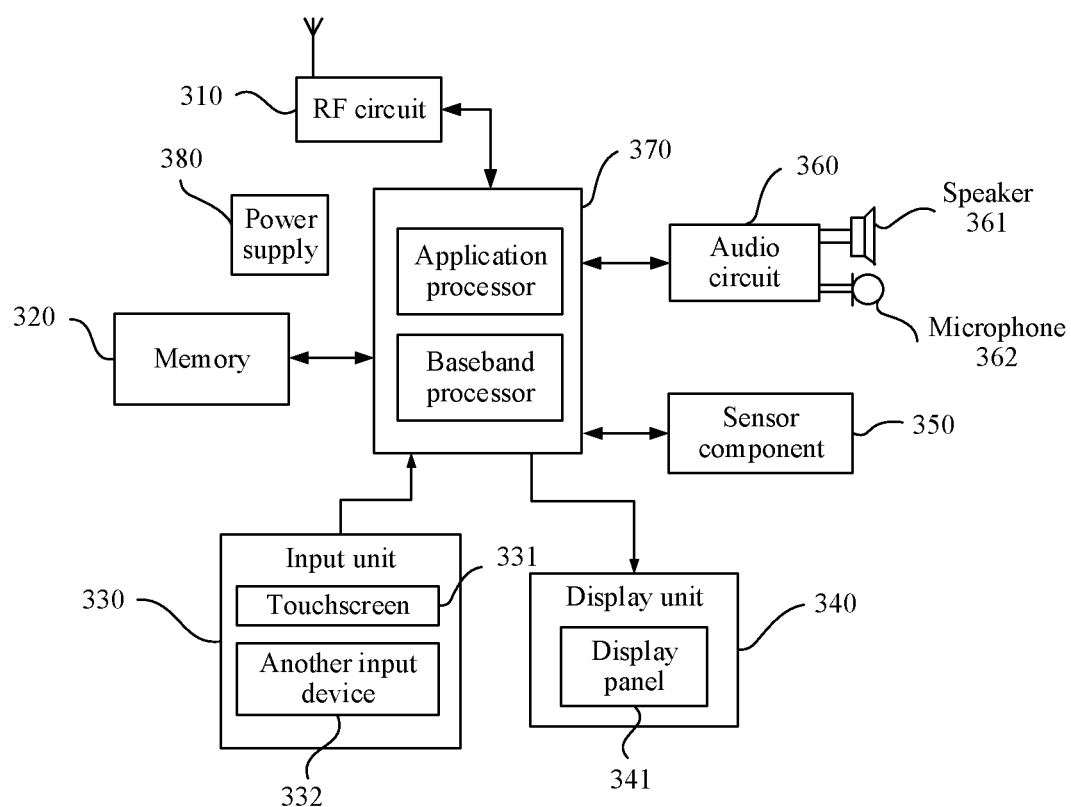
FIG. 3 is a schematic structural diagram 1 of a terminal device according to an embodiment of this application.

FIG. 3 is a schematic structural diagram of a terminal device according to an embodiment of this application. Referring to FIG. 3, an example in which the terminal device is a mobile phone is used for description. The mobile phone includes components such as a radio frequency (radio frequency, RF) circuit 310, a memory 320, an input unit 330, a display unit 340, a sensor component 350, an audio circuit 360, a processor 370, and a power supply 380. Each component of the mobile phone is described below in detail with reference to FIG. 3.

The RF circuit 310 may be configured to receive a signal and send a signal in an information sending and receiving process or a call process. Usually, the RF circuit 310 includes but is not limited to an antenna, an amplifier, a transceiver, a coupler, an LNA (low noise amplifier, low noise amplifier), a duplexer, and the like. Optionally, the antenna may include a plurality of receive antennas and a plurality of transmit antennas. In addition, the RF circuit 310 may further communicate with a network and another device through wireless communication.

The memory 320 may be configured to store a software program and a module. The processor 370 runs the software program and the module that are stored in the memory 320, to implement various function applications and data processing of the mobile phone. The memory 320 may mainly include a program storage area and a data storage area. The program storage area may store an operating system, an application program required by at least one function, and the like. The data storage area may store data (such as audio data, image data, and a phone book) that is created based on use of the mobile phone, and the like. In addition, the memory 320 may include a high-speed random access memory, and may further include a non-volatile memory, for example, at least one magnetic disk storage device, a flash storage device, or another volatile solid-state storage device.

The input unit 330 may be configured to receive input digital or character information, and generate a key signal input related to user setting and function control of the mobile phone. Specifically, the input unit 330 may include a touchscreen 331 and another input device 332. The touchscreen 331 is also referred to as a touch panel, and may collect a touch operation (for example, an operation performed by a user on or near the touchscreen 331 by using any proper object or accessory such as a finger or a stylus) performed by the user on or near the touchscreen 331, and drive a corresponding connection apparatus by using a preset program. The another input device 332 may include but is not limited to one or more of a physical keyboard, a function key (such as a volume control key or a power on/off key), a trackball, a mouse, a joystick, or the like.

The display unit 340 may be configured to display information entered by the user or information provided for the user, and various menus of the mobile phone. The display unit 340 may include a display panel 341. Optionally, the display panel 341 may be configured in a form of a liquid crystal display (liquid crystal display, LCD), an organic light-emitting diode (organic light-emitting diode, OLED), and the like. Further, the touchscreen 331 may cover the display panel 341. After detecting the touch operation on or near the touchscreen 331, the touchscreen 331 sends the touch operation to the processor 370 to determine a type of a touch event. Then, the processor 370 provides corresponding visual output on the display panel 341 based on the type of the touch event. Although the touchscreen 331 and the display panel 341 in FIG. 3 are used as two independent components to implement input and output functions of the mobile phone, in some embodiments, the touchscreen 331 and the display panel 341 may be integrated to implement the input and output functions of the mobile phone.

The sensor component 350 includes one or more sensors, and is configured to provide status evaluation in various aspects for the mobile phone. The sensor component 350 may include a temperature sensor, an acceleration sensor, a gyro sensor, a magnetic sensor, or a pressure sensor. The sensor component 350 may detect a temperature change of the mobile phone, acceleration/deceleration of the mobile phone, an orientation of the mobile phone, an on/off state of the mobile phone, relative positioning of the component, or the like. In addition, the sensor component 350 may further include an optical sensor, for example, a CMOS or CCD image sensor, configured for use in an imaging application.

The audio circuit 360, a speaker 361, and a microphone 362 may provide an audio interface between the user and the mobile phone. The audio circuit 360 may convert received audio data into an electrical signal and transmit the electrical signal to the speaker 361, and the speaker 361 converts the electrical signal into a sound signal and outputs the sound signal. In addition, the microphone 362 converts a collected sound signal into an electrical signal, and the audio circuit 360 receives the electrical signal and converts the electrical signal into audio data, and outputs the audio data to the RF circuit 310 to send the audio data to, for example, another mobile phone, or outputs the audio data to the memory 320 for further processing.

The processor 370 is a control center of the mobile phone, is connected to each part of the entire mobile phone through various interfaces and various lines, and executes various functions and data processing of the mobile phone by running or executing the software program and/or the module that are/is stored in the memory 320 and invoking data stored in the memory 320, to perform overall monitoring on the mobile phone. Optionally, the processor 370 may include one or more processing units. In the embodiments of this application, the processor 370 may integrate an application processor and a modem processor. The application processor mainly processes an operating system, a user interface, an application program, and the like. The modem processor mainly processes wireless communication, for example, is configured to perform one or more steps of the registration method in a cell provided in the embodiments of this application. It may be understood that the modem processor may alternatively not be integrated into the processor 370.

The mobile phone further includes the power supply 380 (for example, a battery) that supplies power to each component. Preferably, the power supply may be logically connected to the processor 370 through a power management system, to implement functions such as charging management, discharging management, and power consumption management through the power management system.

Further, the mobile phone may further include a connectivity (connectivity) chip. The connectivity chip may integrate one or more of a wireless fidelity (wireless fidelity, Wi-Fi) module, a Bluetooth module, a near field communication (near field communication, NFC) module, and a global navigation satellite system (global navigation satellite system, GNSS) module, or a frequency modulation (frequency modulation, FM) module. Details are not described herein again in this application.

A person skilled in the art may understand that the structure of the mobile phone shown in FIG. 3 does not constitute a limitation on the mobile phone, and the mobile phone may include more or fewer components than those shown in the figure, or combine some components, or have a different component arrangement.

Figure 4:
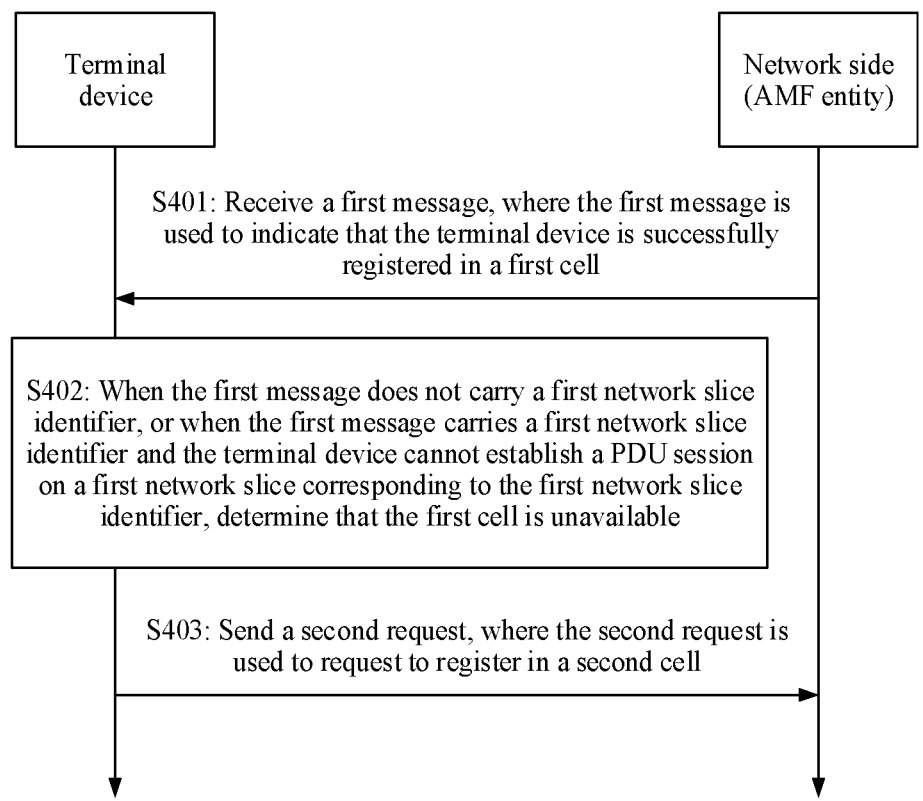
FIG. 4 is a schematic flowchart 1 of a registration method in a cell according to an embodiment of this application.

FIG. 4 is a schematic flowchart of a registration method in a cell according to an embodiment of this application. Referring to FIG. 4, the method includes the following several steps.

S401: A terminal device receives a first message, where the first message is used to indicate that the terminal device is successfully registered in a first cell.

A cell is a minimum unit for providing a service for the terminal device, and the first cell is a cell in which the terminal device is currently registered. When the terminal device initiates a registration procedure to a network side in the first cell, the terminal device may send, to the network side, a first request used to request to register in the first cell. The first request may also be referred to as a first registration request. When the network side receives the first request, the network side may send, to the terminal device, the first message used to indicate that the terminal device is successfully registered in the first cell. The first message may also be referred to as a first registration accept message. For example, in the 5G network shown in FIG. 2, the terminal device may send the first registration request to the AMF entity in the PLMN, and the first registration request is transparently transmitted to the AMF entity through the RAN device in the access network. When the AMF entity receives the first registration request, the AMF entity may send the first registration accept message to the terminal device, and the first registration accept message is transparently transmitted to the terminal device through the RAN device in the access network.

Optionally, the first registration request may carry requested NSSAI, or may not carry requested NSSAI. This is not specifically limited in this embodiment of this application. The requested NSSAI herein may include one or more S-NSSAI values of network slices with which the terminal device expects to be registered.

S402: When the first message does not carry a first network slice identifier, or when the first message carries a first network slice identifier and the terminal device cannot establish a PDU session on a first network slice corresponding to the first network slice identifier, the terminal device determines that the first cell is unavailable.

Specifically, that the terminal device determines that the first cell is unavailable may include the following three cases. An example in which the first message is the first registration accept message is used below to describe each case in detail.

Case 1: The first registration accept message does not carry the first network slice identifier, in other words, a registration type corresponding to the first registration request is non-emergency registration, and the first registration accept message does not carry allowed NSSAI, or a length of NSSAI content of allowed NSSAI carried in the first registration accept message is 0. The first network slice identifier herein may be an NS SAI value included in the allowed NSSAI.

A type of registration initiated by the terminal device may include emergency registration and non-emergency registration. The emergency registration may include registration related to an emergency call (for example, a voice call to 110 or 120 that is made by using the terminal device when no SIM card is inserted). The non-emergency registration may include registration other than the emergency registration, for example, initial registration (initial registration), mobility registration updating (mobility registration updating), and periodic registration updating (periodic registration updating). The first registration request may include a specific field used to indicate the registration type. For example, a packet corresponding to the first registration request is shown in FIG. 2B. The specific field is the field b in FIG. 2B. It is assumed that the field b includes 3 bits (bit). When the 3 bits are set to "100", the field indicates the emergency registration. When the 3 bits are set to "001", the field indicates the initial registration. When the 3 bits are set to "010", the field indicates the mobility registration updating. When the 3 bits are set to "011", the field indicates the periodic registration updating.

After the terminal device receives the first registration accept message, the terminal device may parse the first registration accept message to determine whether the first registration accept message carries the allowed NSSAI. When the terminal device determines that the current registration type is non-emergency registration and the first registration accept message does not carry the allowed NSSAI, or when the terminal device determines that the current registration type is non-emergency registration and the length of the NSSAI content of the allowed NSSAI carried in the first registration accept message is 0, the terminal device determines that the first cell is unavailable.

Case 2: That the first registration accept message carries a first network slice identifier and the terminal device cannot establish a PDU session on a first network slice corresponding to the first network slice identifier is specifically: A registration type corresponding to the first registration accept message is non-emergency registration, the first registration accept message does not carry configured NSSAI, and a service type of allowed NSSAI that is carried is different from a target service type. The first network slice identifier herein may be an NS SAI value included in the allowed NSSAI.

The target service type may be a service type required by the terminal device. For example, if the terminal device is a terminal device that uses a fixed service type, the service type required by the terminal device is the fixed service type. The fixed service type may be eMBB, uRLLC, MIoT, or the like. This is not specifically limited in this embodiment of this application.

In addition, the allowed NSSAI may include one or more S-NSSAI values, and the service type of the allowed NSSAI may include service types of the one or more S-NSSAI values. A service type of an S-NSSAI value may be determined based on a value of an SST in the S-NSSAI value. For details, refer to related descriptions in Table 1. Details are not described herein again in this embodiment of this application.

After the terminal device parses the first registration accept message, when the terminal device determines that the current registration type is non-emergency registration, the first registration accept message carries the allowed NSSAI but does not carry the configured NSSAI, and the service type of the allowed NS SAI that is carried is different from the target service type, the terminal device determines that the first cell is unavailable.

For example, the target service type is eMBB, the allowed NSSAI carried in the first registration accept message includes two S-NSSAI values, and service types of the two S-NSSAI values are both uRLLC (that is, values of SSTs in the two S-NSSAI values are both 2). The service type uRLLC of the allowed NSSAI is different from the target service type eMBB. Therefore, the terminal device may determine that the service type of the allowed NSSAI is different from the target service type.

It should be noted that for a specific description of the registration type, refer to the description in the case 1. Details are not described herein again in this embodiment of this application.

Case 3: That the first registration accept message carries a first network slice identifier and the terminal device cannot establish a PDU session on a first network slice corresponding to the first network slice identifier is specifically: When a registration type corresponding to the first registration accept message is non-emergency registration, and both a service type of allowed NSSAI carried in the first registration accept message and a service type of configured NSSAI carried in the first registration accept message are different from a target service type, it is determined that the first cell is unavailable. The first network slice identifier herein may be an NSSAI value included in the allowed NSSAI and/or an NSSAI value included in the configured NSSAI.

After the terminal device parses the first registration accept message, when the terminal device determines that the current registration type is non-emergency registration, the first registration accept message carries the allowed NSSAI and the configured NSSAI, and both the service type of the allowed NSSAI and the service type the configured NSSAI are inconsistent with the target service type, the terminal device determines that the first cell is unavailable.

For example, the target service type is eMBB, the allowed NSSAI carried in the first registration accept message includes two S-NSSAI values, and the configured NSSAI carried in the first registration accept message includes three S-NSSAI values. Service types of the two S-NSSAI values are both uRLLC (that is, values of SSTs in the two S-NSSAI values are both 2). Service types of two of the three S-NSSAI values are uRLLC, and a service type of one of the three S-NSSAI values is MIoT (that is, a value of an SST in the S-NSSAI value is 3). Both the service type uRLLC and the service type MIoT are different from the target service type eMBB. Therefore, the terminal device may determine that the service type of the allowed NS SAI and the service type of the configured NSSAI are different from the target service type. In this case, at least one first network slice identifier may be the two S-NSSAI values included in the allowed NSSAI and the three S-NSSAI values included in the configured NSSAI.

It should be noted that for a related description of the registration type, refer to the related description in the case 1, and for related descriptions of the target service type, the service type of the allowed NSSAI, and the service type of the configured NSSAI, refer to the descriptions in the case 2. Details are not described herein again in this embodiment of this application.

S403: The terminal device sends a second request, where the second request is used to request to register in the second cell.

The second request may be a second registration request, and the terminal device may send, to an AMF entity on the network side, the second registration request used to request to register in the second cell. The AMF entity receiving the second registration request may be the same as or different from the AMF entity receiving the first registration request in S401. This is specifically related to a structure of the network side. This is not specifically limited in this embodiment of this application.

It should be noted that a process in which the terminal device sends the second registration request to the network side may be similar to the process in which the terminal device sends the first registration request to the network side described in S401. For details, refer to the description in S401. Details are not described herein in this embodiment of this application.

Figure 5:
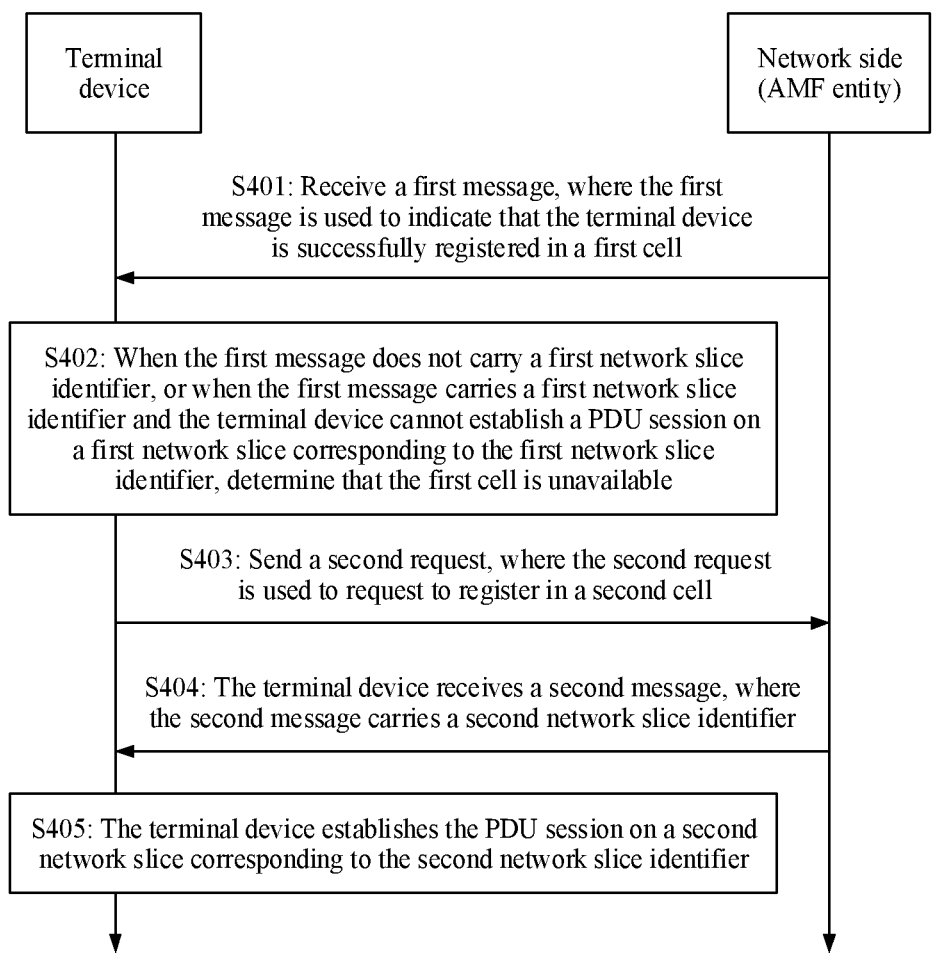
FIG. 5 is a schematic flowchart 2 of a registration method in a cell according to an embodiment of this application.

Further, referring to FIG. 5, after S403, the method further includes S404.

S404: The terminal device receives a second message, where the second message carries a second network slice identifier.

The second message may be a second registration accept message. When the network side receives the second registration request, the network side may send the second registration accept message to the terminal device. The second registration accept message is used to indicate that the terminal device is successfully registered in the second cell, and the second registration accept message may carry at least one second network slice identifier. Further, the terminal device may attempt to establish a PDU session on a second network slice corresponding to the at least one second network slice identifier carried in the second registration accept message. For example, after the AMF entity on the network side receives the second registration request, the AMF entity may send the second registration accept message to the terminal device. In this way, when the terminal device receives the second registration accept message, the terminal device may attempt to establish the PDU session on the second network slice corresponding to the at least one second network slice identifier carried in the second registration accept message.

In this embodiment of this application, when the terminal device determines that the first cell is unavailable, the terminal device may re-initiate a registration procedure in the second cell, to resolve a problem that when a cell in which the terminal device is currently successfully registered is unavailable, the terminal device cannot perform a subsequent operation or cannot further obtain a required service.

Further, referring to FIG. 5, after S404, the method further includes S405.

S405: The terminal device establishes the PDU session on the second network slice corresponding to the second network slice identifier.

When the terminal device receives the second registration accept message, the terminal device may determine, based on the second registration accept message, whether the second cell is an available cell, that is, whether the terminal device can establish the PDU session on the second network slice corresponding to the second network slice identifier. The second registration accept message may carry at least one second network slice identifier. If a PDU session can be established on a second network corresponding to one of the at least one second network slice identifier, the second cell is an available cell. Further, the terminal device may establish the PDU session in the second cell, to perform a subsequent operation or obtain a required service. If no PDU session can be established on a second network corresponding to one of the at least one second network slice identifier, the second cell is an unavailable cell. Further, the terminal device may perform S403 again (in this case, the second cell is the first cell in S402). To be specific, the terminal device re-initiates a registration procedure in another second cell until the PDU session is established in the reselected second cell.

Specifically, a process in which the terminal device determines, based on the second registration accept message, that the second cell is an available cell may include: When a registration type indicated by the second registration request is non-emergency registration, the second registration accept message carries allowed NSSAI but does not carry configured NSSAI, and a service type of an S-NSSAI value in the allowed NSSAI is consistent with the target service type, the terminal device determines that the second cell is an available cell (in this case, the second network slice identifier may be the S-NSSAI value included in the allowed NS SAD. Alternatively, when a registration type indicated by the second registration request is non-emergency registration, the second registration accept message carries allowed NSSAI and configured NSSAI, and a service type of an S-NSSAI value in the allowed NSSAI is consistent with the target type, or a service type of an S-NSSAI value in the configured NSSAI is consistent with the target service type, the terminal device determines that the second cell is an available cell (in this case, the second network slice identifier may be the S-NSSAI value included in the allowed NS SAI or the S-NSSAI value included in the configured NSSAI).

After the terminal device determines, based on the second registration accept message, that the second cell is an available cell, the terminal device may select a network slice based on the allowed NSSAI carried in the second registration accept message, and perform a subsequent PDU session establishment operation on the selected network slice. Alternatively, the terminal device selects a network slice whose service type is the same as the target service type, and obtains a required service from the selected network slice, to provide a service for a user, that is, establish the PDU session on the second network slice corresponding to the at least one second network slice identifier.

Figure 6:
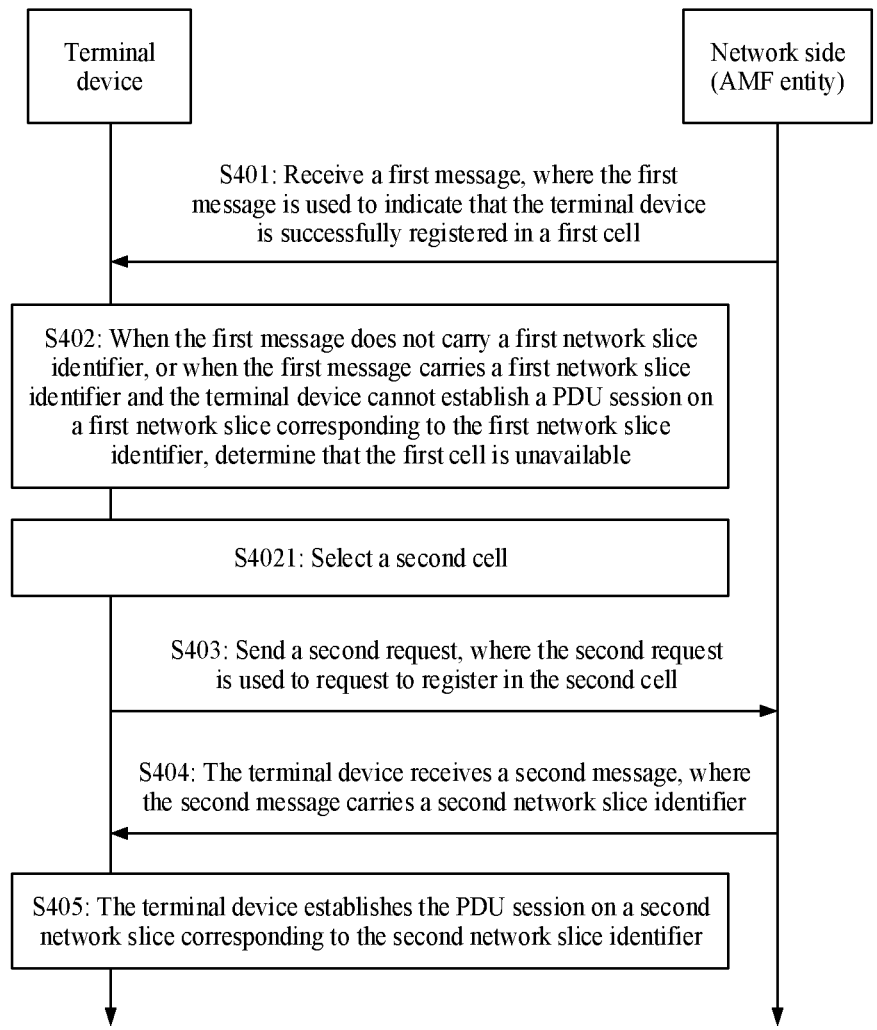
FIG. 6 is a schematic flowchart 3 of a registration method in a cell according to an embodiment of this application.

Further, referring to FIG. 6, before S403, the method may further include S4021.

S4021: The terminal device selects the second cell.

Specifically, when selecting the second cell, the terminal device may select the second cell from different ranges. Optionally, the terminal device selects the second cell from a first tracking area including the first cell. For example, the first tracking area includes a plurality of cells, and the terminal device may select the second cell from cells other than the first cell in the plurality of cells. Alternatively, the terminal device selects the second cell from a plurality of cells included in a second tracking area. The second tracking area is different from the first tracking area. For example, the second tracking area and the first tracking area may be two different tracking areas in a same registration area. Alternatively, the terminal device selects the second cell from a plurality of cells included in a second registration area. The second registration area is different from a first registration area including the first cell. For example, the second registration area and the first registration area may be two different registration areas in a same PLMN. Alternatively, the terminal device selects the second cell from a plurality of cells included in a second PLMN. The second PLMN is different from a first PLMN including the first cell. For example, the second PLMN and the first PLMN are different PLMNs provided by a same operator, or PLMNs provided by different operators.

Figure 7:
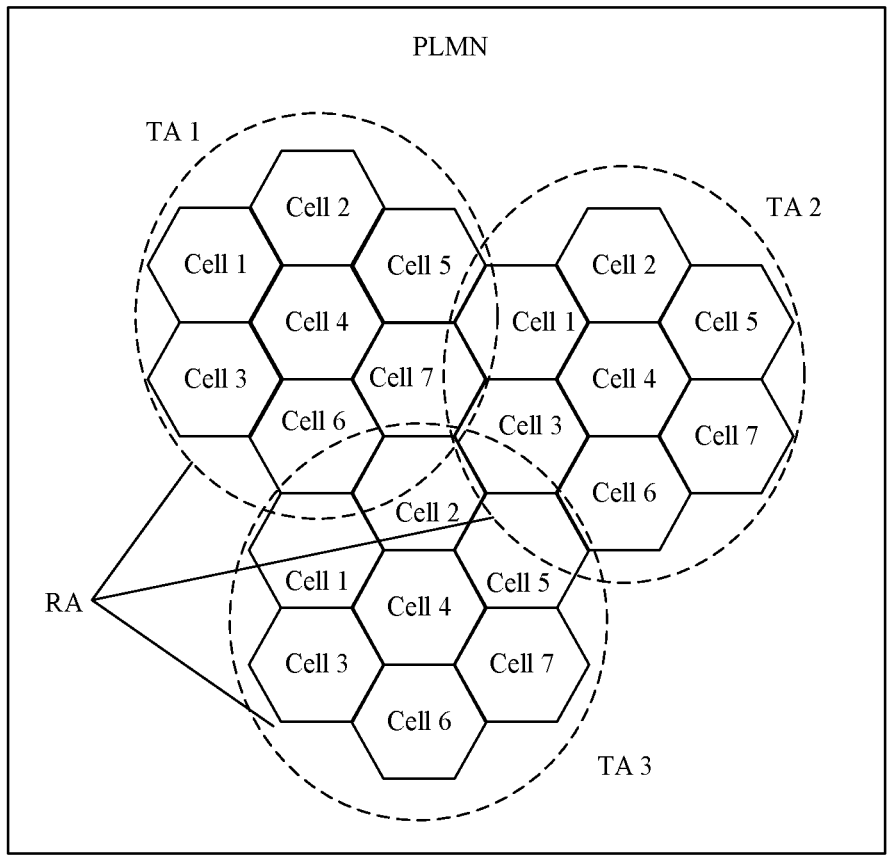
FIG. 7 is a schematic diagram of a relationship between different locations in a PLMN according to an embodiment of this application.

A cell (cell), a tracking area (tracking area, TA), and a registration area (registration area, RA) are location information of different levels in a same PLMN. One PLMN may include a plurality of RAs, one RA may include a plurality of TAs, and one TA may include a plurality of cells. For example, a relationship between a cell, a TA, an RA, and a PLMN may be shown in FIG. 7. A range of a cell is smallest, for example, a cell 1 to a cell 7 shown in FIG. 7. A tracking area (for example, a TA 1, a TA 2, and a TA 3 shown in FIG. 7) is a set of cells. The terminal device does not need to perform location updating when moving between cells inside a tracking area. A registration area (for example, an RA shown in FIG. 7) is a set of tracking areas.

For example, when the terminal device determines, based on the case 1 or the case 2 in S402, that the first cell is unavailable, the terminal device may select the second cell from the cells included in the first tracking area, the second tracking area, the second registration area, or the second PLMN. When the terminal device determines, based on the case 3 in S402, that the first cell is unavailable, the terminal device may directly select the second cell from the cells included in the second PLMN.

Further, before the terminal device selects the second cell from the first tracking area including the first cell, the terminal device may further mark the first cell as a barred (barred) cell. Alternatively, before the terminal device selects the second cell from the second tracking area, the terminal device may further mark the first tracking area as a forbidden tracking area, for example, add the first tracking area to a forbidden tracking area list. The forbidden tracking area list may be maintained by a 5G terminal device (for example, "5GS forbidden tracking areas for regional provision of service" or "5GS forbidden tracking areas for roaming"). Alternatively, before the terminal device selects the second cell from the second registration area, the terminal device may further mark the first registration area as a forbidden registration area, for example, add the first registration area to a forbidden registration area list. Alternatively, before the terminal device selects the second cell from the second PLMN, the terminal device may further mark the first PLMN as a forbidden PLMN, for example, add the first PLMN to a forbidden PLMN list. For example, the forbidden PLMN list is a list of N1 mode_disabled PLMNs.

For example, an example in which the terminal device adds the first PLMN to the forbidden PLMN list is used for description. It is assumed that the forbidden PLMN list is shown in Table 3, and includes a list of N1 mode_disabled PLMNs and a list of another mode_disabled PLMNs. Specifically, before the terminal device adds the first PLMN to the list of N1 mode_disabled PLMNs, if the list of N1 mode_disabled PLMNs includes PLMN_1, PLMN_2, and PLMN_3, after the terminal device adds the first PLMN to the list of N1 mode_disabled PLMNs, the list of N1 mode_disabled PLMNs includes the PLMN_1, the PLMN_2, the PLMN_3, and PLMN_4. In other words, the PLMN_4 is an identifier of the first PLMN. In Table 3, an example in which the list of another mode_disabled PLMNs includes PLMN_4, PLMN_5, and the like is used for description.

TABLE 3

| | Forbidden PLMN lists | |
|---|---|---|
| Sequence number | List of N1 mode-disabled PLMNs | List of another mode-disabled PLMNs |
| 1 | PLMN_1 | PLMN_4 |
| 2 | PLMN_2 | PLMN_5 |
| 3 | PLMN_3 | . . . |
| 4 | PLMN_4 (First PLMN) | |

Further, when the terminal device determines, based on the first registration accept message, that the first cell is unavailable, the terminal device may further deregister in the first cell. Specifically, the terminal device may locally perform a deregistration operation. For example, the terminal device deletes a locally stored context related to registration of the first cell. In addition, the terminal device initiates a deregistration procedure to the network side. For example, the terminal device sends a deregistration request to the AMF entity on the network side. After the AMF entity receives the deregistration request, the AMF entity may delete a context that is related to registration of the first cell and that is stored on the network side, and then the AMF entity sends a deregistration accept message (de-registration accept) to the terminal device, to notify the terminal device that the network side has completed deregistration from the first cell.

The foregoing mainly describes the solutions provided in the embodiments of this application from a perspective of interaction between network elements. It may be understood that to implement the foregoing functions, each network element, such as the terminal device, includes a corresponding hardware structure and/or software module that is used to perform each function. A person skilled in the art should be easily aware that, in combination with the network elements and algorithm steps in the examples described in the embodiments disclosed in this specification, this application may be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In the embodiments of this application, the terminal device may be divided into functional modules based on the foregoing method examples. For example, each functional module may be obtained through division for each function, or two or more functions may be integrated in one processing module. The integrated module may be implemented in a form of hardware, or may be implemented in a form of a software functional module. It should be noted that, in the embodiments of this application, division into modules is an example, and is merely logical function division. During actual implementation, there may be another division manner.

Figure 8:
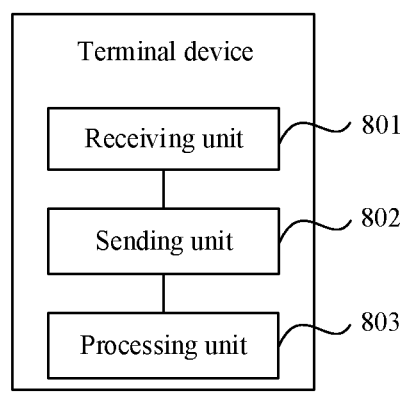
FIG. 8 is a schematic structural diagram 2 of a terminal device according to an embodiment of this application.

When functional modules are obtained through division based on corresponding functions, FIG. 8 is a possible schematic structural diagram of a terminal device in the foregoing embodiment. The terminal device includes a receiving unit 801 and a sending unit 802. The receiving unit 801 is configured to support the terminal device in performing one or more steps in S401 and S404 in the foregoing method embodiment. The sending unit 802 is configured to support the terminal device in performing S403 in the foregoing method embodiment. Further, the terminal device further includes a processing unit 803. The processing unit 803 is configured to support the terminal device in performing S402, S4021, and S405 in the foregoing method embodiment, and/or another technical process described in this specification.

In hardware implementation, the processing unit 803 may be a processor, the receiving unit 801 may be a receiver, the sending unit 802 may be a transmitter, and the receiver and the transmitter may form a communications interface.

Figure 9:
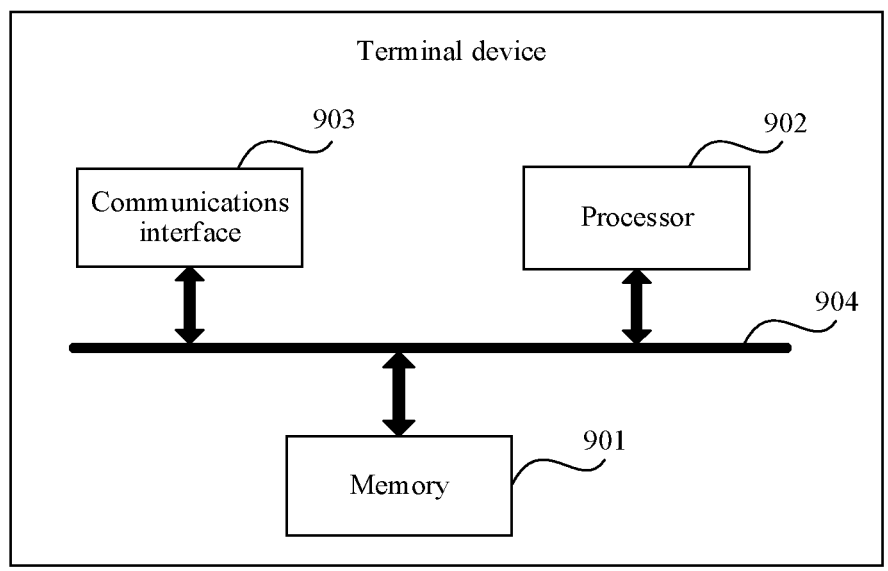
FIG. 9 is a schematic structural diagram 3 of a terminal device according to an embodiment of this application.

FIG. 9 is a possible schematic logical structural diagram of the terminal device in the foregoing embodiments according to an embodiment of this application. The terminal device includes a memory 901 and a processor 902. The memory 901 is configured to store code and data of the terminal device. In this embodiment of this application, the processor 902 is configured to control and manage an action of the terminal device. For example, the processor 902 is configured to support the terminal device in performing S402, S4021, and S405 in the foregoing method embodiment, and/or another technical process described in this specification. Optionally, the terminal device may further include a communications interface 903 and a bus 904, and the processor 902, the communications interface 903, and the memory 901 are connected to each other through the bus 904. The communications interface 903 is configured to support the terminal device in performing communication.

The processor 902 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 904 may be a peripheral component interconnect (peripheral component interconnect, PCI) bus, an extended industry standard architecture (extended industry standard architecture, EISA) bus, or the like. The bus may be categorized as an address bus, a data bus, a control bus, and the like. For ease of representation, only one thick line is used to represent the bus in FIG. 9, but this does not mean that there is only one bus or only one type of bus.

In another embodiment of this application, a chip is further provided. The chip may be built in a terminal device. For a structure of the chip, refer to FIG. 9. The chip is configured to support the terminal device in performing one or more steps in the foregoing method embodiment.

In another embodiment of this application, a communications system is further provided. The communications system includes a network side device and a terminal device. The terminal device may be the terminal device provided in FIG. 3, FIG. 8, or FIG. 9, and is configured to perform one or more steps of the terminal device in the foregoing method embodiment.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing the terminal device to perform all or some of the steps of the method described in the embodiments of this application. The foregoing storage medium includes: any medium that can store program code, such as a USB flash drive, a removable hard disk, a ROM, a RAM, a magnetic disk, or an optical disc.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A registration method implemented by a terminal device, comprising:
sending a first request requesting to register in a first cell;
receiving, in response to the first request, a first message indicating that the terminal device is successfully registered in the first cell;
sending, in response to the first message, a second request requesting to register in a second cell when the first message does not carry a first network slice identifier or when the first message carries the first network slice identifier and the terminal device cannot establish a protocol data unit (PDU) session on a first network slice corresponding to the first network slice identifier, wherein the second cell is different from the first cell;
receiving, in response to the second request, a second message carrying a second network slice identifier; and
establishing, in response to the second message, the PDU session on a second network slice corresponding to the second network slice identifier.

2. The registration method of claim 1, wherein before sending the second request, the registration method further comprises selecting the second cell from a first tracking area comprising the first cell.

3. The registration method of claim 2, further comprising marking the first cell as a barred cell.

4. The registration method of claim 1, wherein before sending the second request, the registration method further comprises selecting the second cell from a second tracking area, and wherein the second tracking area is different from a first tracking area comprising the first cell.

5. The registration method of claim 4, further comprising marking the first tracking area as a forbidden tracking area.

6. The registration method of claim 1, wherein before sending the second request, the registration method further comprises selecting the second cell from a second registration area, and wherein the second registration area is different from a first registration area comprising the first cell.

7. The registration method of claim 6, further comprising marking the first registration area as a forbidden registration area.

8. The registration method of claim 1, wherein before sending the second request, the registration method further comprises selecting the second cell from a second public land mobile network (PLMN), and wherein the second PLMN is different from a first PLMN comprising the first cell.

9. The registration method of claim 8, further comprising marking the first PLMN as a forbidden PLMN.

10. The registration method of claim 1, wherein before sending the second request, the registration method further comprises deregistering in the first cell.

11. The registration method of claim 1, wherein a registration type corresponding to the first message is non-emergency registration, and wherein either the first message does not carry allowed network slice selection assistance information (NSSAI) or the first message carries the allowed NSSAI and a length of the allowed NSSAI is zero.

12. The registration method of claim 1, wherein a registration type corresponding to the first message is non-emergency registration, wherein the first message does not carry configured network slice selection assistance information (NSSAI), wherein a service type of allowed NSSAI that is carried in the first message is different from a target service type, and wherein the first network slice identifier is comprised in the allowed NSSAI.

13. The registration method of claim 1, wherein a registration type corresponding to the first message is non-emergency registration, wherein a first service type of allowed network slice selection assistance information (NSSAI) and a second service type of configured NSSAI carried in the first message are different from a target service type, and wherein the first network slice identifier is comprised in the allowed NSSAI, in the configured NSSAI, or in the allowed NSSAI and the configured NSSAI.

14. A terminal device, comprising
a memory configured to store instructions; and
a processor coupled to the memory and configured to execute the instructions to cause the terminal device to be configured to:
receive a first message from a first cell, wherein the first message indicates that the terminal device is successfully registered in the first cell; and
send, in response to the first message, a second request requesting to register in a second cell when the first message does not carry a first network slice identifier or when the first message carries the first network slice identifier and the terminal device cannot establish a protocol data unit (PDU) session on a first network slice corresponding to the first network slice identifier, wherein the second cell is different from the first cell.

15. The terminal device of claim 14, wherein the instructions further cause the terminal device to be configured to:
receive a second message carrying a second network slice identifier; and
establish, in response to the second message, the PDU session on a second network slice corresponding to the second network slice identifier.

16. The terminal device of claim 14, wherein before the terminal device sends the second request, the instructions further cause the terminal device to be configured to select the second cell from a first tracking area, and wherein the first tracking area comprises the first cell.

17. The terminal device of claim 14, wherein before the terminal device sends the second request, the instructions further cause the terminal device to be configured to select the second cell from a second tracking area, and wherein the second tracking area is different from a first tracking area comprising the first cell.

18. The terminal device of claim 14, wherein before the terminal device sends the second request, the instructions further cause the terminal device to be configured to select the second cell from a second registration area, and wherein the second registration area is different from a first registration area comprising the first cell.

19. The terminal device of claim 14, wherein before the terminal device sends the second request, the instructions further cause the terminal device to select the second cell from a second public land mobile network (PLMN) and wherein the second PLMN is different from a first PLMN comprising the first cell.

20. A computer program product comprising computer-executable instructions stored on a non-transitory computer-readable medium that, when executed by a processor, cause an apparatus to:
receive a first message from a first cell, wherein the first message indicates that a terminal device is successfully registered in the first cell; and
send, in response to the first message, a second request requesting to register in a second cell when the first message does not carry a first network slice identifier or when the first message carries the first network slice identifier and the terminal device cannot establish a protocol data unit (PDU) session on a first network slice corresponding to the first network slice identifier, wherein the second cell is different from the first cell.

* * * * *

UNITED STATES PATENT AND TRADEMARK OFFICE
CERTIFICATE OF CORRECTION

| | | |
|---|---|---|
| PATENT NO. | : 11,910,348 B2 | Page 1 of 1 |
| APPLICATION NO. | : 17/423306 | |
| DATED | : February 20, 2024 | |
| INVENTOR(S) | : Ding Wang, Xiaoyan Duan and Liwei Cui | |

It is certified that error appears in the above-identified patent and that said Letters Patent is hereby corrected as shown below:

On the Title Page

Page 2, Item (56) FOREIGN PATENT DOCUMENTS: IN 108811020 A 11/2018 should read CN 108811020 A 11/2018

Signed and Sealed this
Second Day of April, 2024

Katherine Kelly Vidal
*Director of the United States Patent and Trademark Office*